US005215669A

United States Patent [19]

Koester et al.

[11] Patent Number: 5,215,669

[45] Date of Patent: Jun. 1, 1993

[54] USE OF MIXED HYDROXYETHERS AS AUXILIARIES FOR THE DEHYDRATION OF SOLIDS

[75] Inventors: Rita Koester, Duesseldorf; Maria Liphard, Essen; Gilbert Schenker, Erkrath, all of Fed. Rep. of Germany

[73] Assignee: Henkel Kommanditgesellschaft auf Aktien, Duesseldorf-Holthausen, Fed. Rep. of Germany

[21] Appl. No.: 777,389

[22] PCT Filed: May 28, 1990

[86] PCT No.: PCT/EP90/00851

§ 371 Date: Dec. 4, 1991

§ 102(e) Date: Dec. 4, 1991

[87] PCT Pub. No.: WO90/15295

PCT Pub. Date: Dec. 13, 1990

[30] Foreign Application Priority Data

Jun. 5, 1989 [DE] Fed. Rep. of Germany ....... 3918274

[51] Int. Cl.[5] .............................................. C02F 11/14

[52] U.S. Cl. ....................................... 210/729; 209/5; 210/732; 210/778

[58] Field of Search .................... 209/5; 210/725, 727, 210/728, 729, 732, 778, 609; 252/60

[56] References Cited

U.S. PATENT DOCUMENTS

| | | | |
|---|---|---|---|
| 3,194,758 | 7/1965 | Lissant | 210/732 |
| 4,385,903 | 5/1983 | Moriyama et al. | 210/732 |
| 4,559,143 | 12/1985 | Asada et al. | 210/778 |
| 4,925,587 | 5/1990 | Schenker et al. | 252/174.22 |
| 4,990,264 | 2/1991 | Fuller et al. | 210/729 |

FOREIGN PATENT DOCUMENTS

| | | | |
|---|---|---|---|
| WO85/03065 | 7/1985 | PCT Int'l Appl. | 210/732 |

*Primary Examiner*—Peter Hruskoci
*Attorney, Agent, or Firm*—Ernest G. Szoke; Wayne C. Jaeschke; Real J. Grandmaison

[57] ABSTRACT

The use of mixed hydroxyethers of the general formula I $$R^1O-(CH_2CH_2O)_x-CH_2-CH(OH)R^2 \quad (I)$$

in which $R^1$ denotes an alkyl group having 1 to 10 carbon atoms $R^2$ denotes an alkyl group having 8 to 20 carbon atoms and x denotes a number in the range from 1 to 20 as auxiliaries for the dehydration of water-containing finely divided solids, gives solids having a low water content without foaming in the water separated therefrom.

10 Claims, No Drawings

USE OF MIXED HYDROXYETHERS AS AUXILIARIES FOR THE DEHYDRATION OF SOLIDS

BACKGROUND OF THE INVENTION

1. Field of the Invention

The invention relates to the use of mixed hydroxyethers of the general formula I $$R^1O—(CH_2CH_2O)_x—CH_2\text{-}CH(OH)R^2 \qquad (I)$$

in which $R^1$ denotes an alkyl group having 1 to 10 carbon atoms, $R^2$ denotes an alkyl group having 8 to 20 carbon atoms and x denotes a number in the range from 1 to 20 as auxiliaries for the dehydration of water-containing finely divided solids.

2. Discussion of Related Art

In many branches of industry, e.g. in mining or in sewage treatment plants, large amounts of finely divided solids having high water contents, which have to be dehydrated before further processing of the solids or their disposal, are formed. Thus, for example, the dehydration of water-containing coal or coke is a central process in the processing of fuels based on coal. The maximum allowable values for the water content of these materials demanded by the market can often be adhered to only with difficulty, since, for example, the coal supplied is produced in very fine particles due to the extensive mechanization of the underground coal mining. Currently, about 38% of the run-of-mine coal is fines having a particle diameter in the range from 0.5 to 10 mm; a further 14% is duff having a particle diameter below that.

It is known to use surfactants as dehydration auxiliaries for the dehydration of water-containing finely divided solids, in particular coals, which make it possible to reduce the residual moisture of fines and duff. This is explained by the property of the surfactant to reduce the surface tension and the capillary pressure of water in the material to be extracted. At the same time, this reduces the adhesive energy which must be supplied to remove the surface water. This leads to improved dehydration, when surfactants are used, while the amount of energy remains unchanged.

Dialkyl sulfosuccinates (U.S. Pat. No. 2,266,954) and nonionic surfactants of the type of alkylphenol polyglycol ethers [Erzmetall 30, 292 (1977)] have been described as surfactant-based dehydrating auxiliaries of the above-mentioned types. However, these surfactants have the disadvantage of showing excessive foaming, which leads to considerable problems in the processing plants, in particular in the recirculation of the water which is usually employed.

DESCRIPTION OF THE INVENTION

Other than in the operating examples, or where otherwise indicated, all numbers expressing quantities of ingredients or reaction conditions used herein are to be understood as modified in all instances by the term "about".

The invention is based on the finding that nonionic surfactants of the general formula I increase the dehydration rate without foaming and reduce the residual moisture of the dehydrated solids when employed in water/solid systems.

The group $R^1$ of the mixed hydroxyethers to be used according to the invention of the general formula I is a straight-chain or branched or cyclic alkyl group having 1 to 10 carbon atoms, for example a methyl, ethyl, propyl, butyl, pentyl, hexyl, heptyl, octyl, nonyl or decyl group. Alkyl groups of the above list having 1 to 4 carbon atoms are preferred. The group $R^2$ in the general formula I is an alkyl group having 8 to 20 carbon atoms, for example an octyl, nonyl, decyl, undecyl, dodecyl, tridecyl, tetradecyl, pentadecyl, hexadecyl, heptadecyl, octadecyl, nonadecyl or eicosyl group, in particular an alkyl group from the above list having 12 to 16 carbon atoms, straight-chain radicals $R^2$ being particularly preferred. x in the general formula I is a number in the range from 1 to 20, the range from 2 to 15 being preferred.

In accordance with their use according to the invention, the mixed hydroxyethers of the general formula I have to be water-soluble. It may occur that the water solubility is not quite sufficient, if the mixed hydroxyethers of the general formula I have low values of x and long-chain radicals $R^1$ and/or $R^2$ where the chain lengths are within the abovementioned limits; however, the required water solubility can be obtained by increasing the value for x within the abovementioned range.

The mixed hydroxyethers of the general formula I are described in DE-A 3,723,323; they can be obtained by reacting ethoxylated alcohols of the general formula II $$R^1O—(CH_2CH_2O)_x—OH \qquad (II)$$

with epoxides of alpha-olefins of the formula III

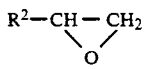

(III)

in the presence of catalysts, in which $R^1$, $R^2$ and x are as defined above.

In accordance with their preparation and the starting materials used, which are in most cases employed in the form of technical grade mixtures, the mixed hydroxyethers to be used according to the invention of the general formula I can also be present as technical grade mixtures.

In accordance with an advantageous embodiment of the invention, the mixed hydroxyethers of the general formula I are used in an amount of 0.5 to 10, in particular 3 to 8, kg per $m^3$ of the water to be removed from the finely divided solids.

As mentioned at the beginning, the mixed hydroxyethers of the general formula I are suitable in particular for the dehydration of water-containing finely divided coal or coke; however, they can also be used in the dehydration of other water/solid systems, for example for beneficiated ores or gangue materials in ore mining, sewage sludges and the like. In this respect, a further advantage of the surfactants to be used according to the invention of the general formula I is that they are compatible with surfactants of different composition, which may be present, for example with dialkyl sulfosuccinates such as di-noctyl sulfosuccinates or polyacrylamides, which were added to the solids to be dehydrated in previous processing steps.

The invention is illustrated in more detail below by way of preferred embodiments.

In the examples, washed fines having the following analytical data were used:

6.8 % by weight of water 3.7 % by weight of ash (wf; calculated with respect to water-free coal)

27.2 % of volatile components (waf; calculated with respect to water- and ash-free coal)

Screen analysis of the fines gave the following values:

| | |
|---|---|
| −0.5 mm | 1.5% |
| 0.5–2.0 mm | 23.1% |
| 2.0–6.3 mm | 51.5% |
| +6.3 mm | 23.9%. |

The efficiency of the mixed hydroxyethers of the general formula I in the dehydration was determined by treating the fines with aqueous solutions of the mixed hydroxyethers of defined concentration and dehydrating them under defined conditions; the residual moisture obtained with and without the addition of surfactant was determined according to DIN 51718 by drying at 106° C. and weighing.

The present examples are laboratory tests in which the amounts of surfactants used in kg are based on 1000 kg each of the solids to be dehydrated (calculated as waterfree solids). In practice, the necessary amounts of surfactants will be less than the ones used in the examples; moreover, the necessary amounts of surfactants used depend on the amount of the water to be removed from the solids, when the solids are dehydrated in practice.

The structure of the mixed hydroxyethers tested of the general formula I and their abbreviations used below can be seen from Table 1.

The term "surfactant" used here and hereinafter refers to the mixed hydroxyethers of the general formula I.

TABLE 1

Mixed hydroxyethers of the formula I
$R^1O-(CH_2CH_2O)_x-CH_2-CH(OH)R^2$

| Surfactant | $R^1$ | $R^2$ | x |
|---|---|---|---|
| A | $CH_3$ | n-$C_{12}H_{25}$ | 2 |
| B | $CH_3$ | n-$C_{12}H_{25}$ | 4 |
| C | n-$C_4H_9$ | n-$C_{12}H_{25}$ | 2 |
| D | n-$C_4H_9$ | n-$C_{16}H_{33}$ | 2 |

EXAMPLE 1

Dehydration in a pressure filter 50 g of coal were added to 400 ml of distilled water or surfactant solutions in distilled water and were filtered after being exposed for 60 seconds. This was done by using a pressure filter which consisted of a sealed neutral filter which was filled with the material to be dehydrated. The dehydration was carried out by subjecting the filter to a pressure of 3 bar. The dehydration time was 30 seconds. The filter material used was a filter fabric having a mesh size of 0.2 mm.

The surfactants tested, the surfactant concentration of the solution with which the coal was treated, the amount of surfactant calculated per 1000 kg of coal and the residual moisture determined are summarized in Table 2.

TABLE 2

| | Pressure filter test | | |
|---|---|---|---|
| Surfactant | Surfactant concentration (g/l) | Amount of surfactant (kg) per 1000 kg of coal | Residual moisture (% by wt.) |
| A | 1.0 | 8 | 8.9 |
| B | 1.0 | 8 | 8.5 |
| C | 1.0 | 8 | 7.2 |
| D | 1.0 | 8 | 9.9 |
| without the addition of surfactant | — | — | 11.6 |

As can be seen from Table 2, the residual moisture of the dehydrated coal is substantially reduced, when the surfactants to be used according to the invention are used compared with that without the addition of surfactant.

EXAMPLE 2

Dehydration in a centrifuge

In this example, a bucket-type centrifuge was used with which at revolutions of 300 to 3,400 per minute centrifugal characteristic values of 15 to 2000 can be obtained. Perforated plates having sieve openings of 0.4 ×4.0 mm were used as sieve plate for the centrifuge. The surfactants used as filtering aids (mixed hydroxyethers of the general formula I) were dissolved in distilled water in concentrations of 0.1 g/l and 1.0 g/l. To carry out the tests, 400 ml each of the surfactant-containing solutions were poured into a glass vessel. 25 g of coal were dipped into each of these solutions. The wetting time was in each case 60 seconds. This was followed by predehydration of the samples at a constant dripping time of 180 seconds. The values obtained in the predehydration of the samples, the surfactant concentration and the amount of surfactant calculated per 1000 kg of coal are summarized in Table 3.

To dehydrate the predehydrated samples in the bucket-type centrifuge, centrifugal characteristic values of 43.2, 111 and 389 (corresponding to revolutions of 500, 800 and 1500 per minute) were established. The dehydration time was 30 seconds. The results obtained are summarized in Table 4.

In a second test series, a surfactant concentration of 1.0 g/l at a centrifugal characteristic value of 111 (corresponding to revolutions of 800 per minute) was tested at dehydration times of 5, 10 and 30 seconds. The results obtained are summarized in Table 5.

As can be seen from Tables 3 to 5, all surfactants tested have a very good effect on the dehydration. Even in the predehydration (Table 3), the efficiency of the surfactants compared with a sample without the addition of surfactant became obvious. While the untreated sample had a residual moisture of 43.6% after a dripping time of 180 seconds, this value could be reduced down to 26.5% by means of the surfactants used according to the invention. This corresponds to a relative reduction in residual moisture by 39%.

As can be seen from Tables 4 and 5, the residual moisture could be reduced not only by increasing the centrifugal characteristic value but also by adding the surfactants to be used according to the invention.

A surfactant solution of 0.1 g/l made it possible to reduce the residual moisture to 4.0% by weight at a centrifugal characteristic value of 111. A surfactant solution of 1.0 g/l decreased the residual moisture down to 3.0%. These values can also be reached with short dehydration times.

TABLE 3

| Surfactant | Surfactant concentration (g/l) | Amount of surfactant (kg) per 1000 kg of coal | Residual moisture (% by wt.) |
|---|---|---|---|
| | Centrifuge test Results of the predehydration | | |
| A | 1.0 | 16 | 26.5 |
| B | 1.0 | 16 | 30.3 |
| C | 1.0 | 16 | 30.1 |
| D | 1.0 | 16 | 34.8 |
| without surfactant | — | — | 43.6 |
| A | 0.1 | 1.6 | 37.5 |
| B | 0.1 | 1.6 | 31.9 |

TABLE 4

| Centrifugal dehydration | | | | | | |
|---|---|---|---|---|---|---|
| Revolutions per minute | 500 | 800 | 1500 | 500 | 800 | 1500 |
| Centrifugal characteristic value | 43.2 | 111 | 389 | 43.2 | 111 | 389 |
| Surfactant concentration (g/1) | 0.1 | 0.1 | 0.1 | 1.0 | 1.0 | 1.0 |
| Surfactant | Residual moisture | | | | | |
| A | 5.7 | 5.3 | 3.5 | 3.6 | 3.1 | 2.6 |
| B | 4.5 | 4.0 | 3.7 | 3.7 | 3.0 | 2.5 |
| C | 5.8 | 4.7 | 3.1 | 6.0 | 4.8 | 3.3 |
| D | 6.9 | 5.9 | 4.1 | 7.0 | 5.2 | 3.7 |
| without addition of surfactant | 7.8 | 6.1 | 3.9 | 7.8 | 6.1 | 3.9 |

TABLE 5

| Results at a centrifugal characteristic value of 111 | | | |
|---|---|---|---|
| Dehydration time(s) | 5 | 10 | 30 |
| Surfactant | Residual moisture (% by wt.) | | |
| A | 3.6 | 3.2 | 3.1 |

TABLE 5-continued

| Results at a centrifugal characteristic value of 111 | | | |
|---|---|---|---|
| B | 3.8 | 3.5 | 3.0 |
| C | 5.5 | 5.1 | 4.8 |
| D | 5.7 | 5.5 | 5.2 |
| without surfactant | 6.8 | 6.7 | 6.1 |

What is claimed is:

1. The process of dehydrating water-containing finely divided solids, comprising contacting said solids with a water-soluble mixed hydroxyether of formula I $$R^1O-(CH_2CH_2O)_x-CH_2-CH(OH)R^2 \qquad (I)$$

wherein $R^1$ represents an alkyl group having 1 to 10 carbon atoms, $R^1$ represents an alkyl group having 8 to 20, said mixed hydroxyether being present in an amount of from about 0.5 to about 10 kg per $m^3$ of the water to be removed from said solids, and then filtering or centrifuging said solids.

2. The process as in claim 1 wherein $R^1$ represents an alkyl group having 1 to 4 carbon atoms.

3. The process as in claim 1 wherein $R^2$ represents an alkyl group having 12 to 16 carbon atoms.

4. The process as in claim 1 wherein x represents a number from about 2 to about 15.

5. The process as in claim 1 wherein said mixed hydroxyether is present in an amount of from about 3 to about 8 kg per $m^3$ of the water to be removed from said solids.

6. The process as in claim 1 wherein said solids are selected from the group consisting of finely divided coal and coke.

7. The process as in claim 1 wherein said solids are selected from the group consisting of beneficiated ores and gangue materials.

8. The process as in claim 1 wherein said solids are selected from the group consisting of sewage sludges.

9. The process as in claim 1 wherein said mixing hydroxyether is present in an aqueous system.

10. The process as in claim 1 wherein said filtering step is conducted under pressure.

* * * * *

UNITED STATES PATENT AND TRADEMARK OFFICE
CERTIFICATE OF CORRECTION

PATENT NO. : 5,215,669

DATED : June 1, 1993

INVENTOR(S) : Koester etal.

It is certified that error appears in the above-identified patent and that said Letters Patent is hereby corrected as shown below:

In claim 1, column 6, line 16, "$R^1$" should read:--$R^2$--.

In claim 1, column 6, line 17, after "20" please insert:
-- carbon atoms, and x represents a number from about 1 to about 20, --.

In claim 9, column 6, line 39, "mixing" should read: -- mixed --.

Signed and Sealed this

Fifteenth Day of March, 1994

*Attest:*

BRUCE LEHMAN

*Attesting Officer*

*Commissioner of Patents and Trademarks*